United States Patent [19]

Ducugnon et al.

[11] Patent Number: 5,501,469
[45] Date of Patent: Mar. 26, 1996

[54] AXIALLY COMPACT UNITIZED LIP SEAL

[75] Inventors: Jean Ducugnon, Calutre; Eugene Faure, Lyon, both of France

[73] Assignee: P.I.V. S.A., Villeurbanne, France

[21] Appl. No.: 258,855

[22] Filed: Jun. 13, 1994

[30] Foreign Application Priority Data

Jun. 14, 1993 [FR] France .................... 93 07347

[51] Int. Cl.⁶ ........................................ F16J 15/32
[52] U.S. Cl. ................. 277/37; 277/153; 277/23
[58] Field of Search ................... 277/23, 14 R, 277/35, 133, 152, 153; 384/147, 148, 484

[56] References Cited

U.S. PATENT DOCUMENTS

| | | | |
|---|---|---|---|
| 1,657,349 | 1/1928 | Eisenhauer | 277/133 |
| 1,659,450 | 2/1928 | Stromeier | 277/133 |
| 1,977,081 | 10/1934 | Olsen | 277/35 |
| 2,695,801 | 11/1954 | Kosatka | 277/153 |
| 2,879,114 | 3/1959 | Bowen | 277/35 |
| 3,022,081 | 2/1962 | Kosatka | 277/153 |
| 4,436,317 | 3/1984 | Schmitt | 277/153 |
| 4,848,776 | 7/1989 | Winckler | 277/23 |
| 5,015,001 | 5/1991 | Jay | 277/152 |

FOREIGN PATENT DOCUMENTS

| | | | |
|---|---|---|---|
| 505793 | 9/1992 | European Pat. Off. | 277/152 |
| 876866 | 11/1942 | France | 277/153 |
| 3902058 | 7/1990 | Germany | 277/14 R |
| 580871 | 9/1946 | United Kingdom | 277/153 |

*Primary Examiner*—Scott W. Cummings
*Attorney, Agent, or Firm*—Herbert Dubno; Andrew Wilford

[57] ABSTRACT

A seal for use between a shaft rotatable about and extending along an axis and a housing through which the shaft passes axially has a rub ring fixed on the shaft outer surface and having an outer surface centered on the axis and a flexible seal ring having a pair of outer axially oppositely directed end faces lying in and defining a pair of axially spaced end planes and formed with an outer portion fixed in the housing, an inner lip engaging radially inward against the outer rub-ring surface, an intermediate portion extending radially inward from the outer portion, and a relatively thin and flexible annular web connecting the lip to the intermediate portion. An inner protector ring lying axially wholly between the planes and radially wholly within the seal ring is fixed in the seal ring and has a radially inwardly projecting inner flange juxtaposed with the rub ring and spaced radially outward from one of the outer surfaces. Similarly an outer protector ring lying axially wholly between the planes and radially wholly within the seal ring is fixed in the seal ring and has a radially inwardly projecting inner flange juxtaposed with the rub ring and spaced radially outward from one of the outer surfaces.

19 Claims, 3 Drawing Sheets

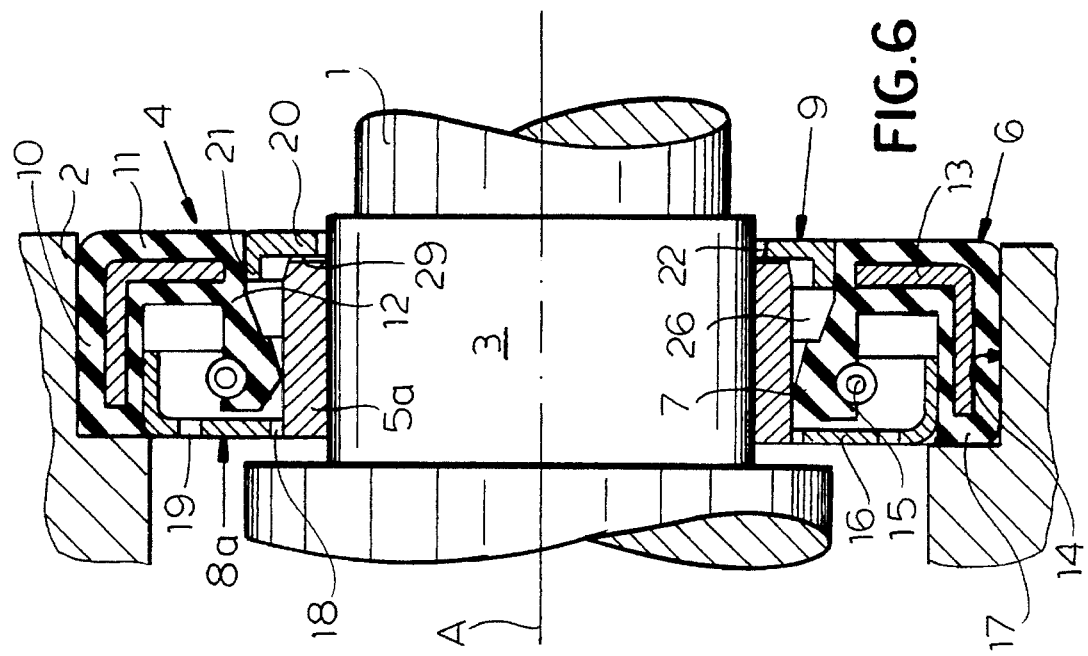
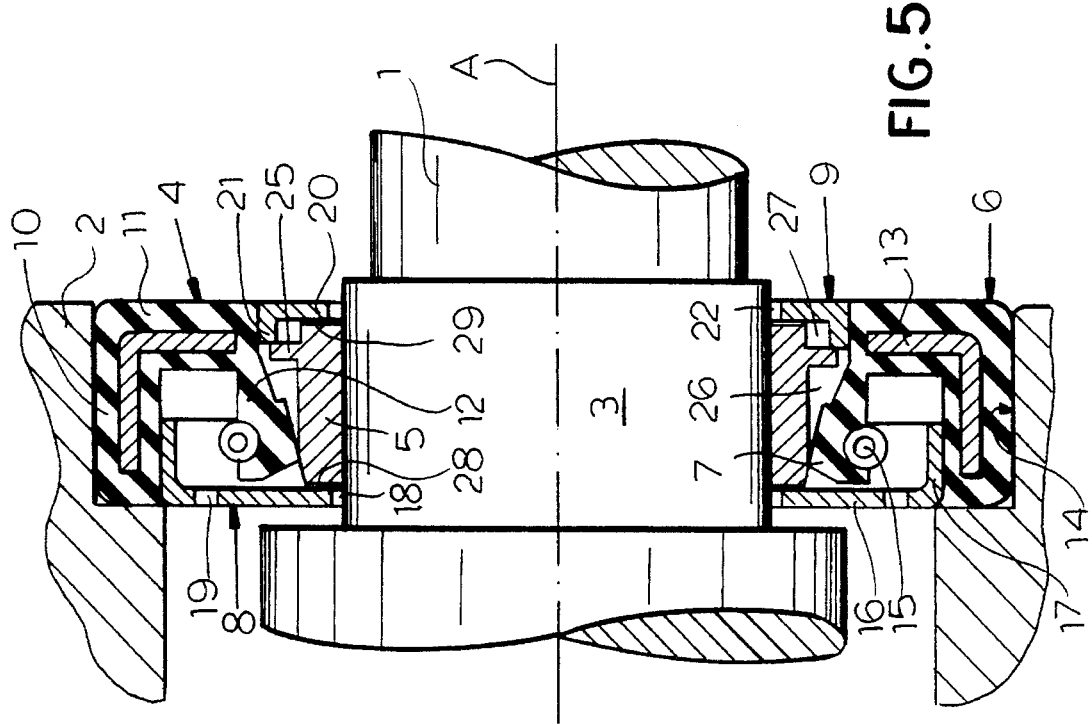

AXIALLY COMPACT UNITIZED LIP SEAL

FIELD OF THE INVENTION

The present invention relates to a shaft seal. More particularly this invention concerns a seal provided between a rotating shaft and a housing member surrounding it.

BACKGROUND OF THE INVENTION

A seal for use between a shaft rotatable about and extending along an axis and a housing through which the shaft passes axially typically has a rub ring fixed on the shaft outer surface and having an outer surface centered on the axis and a flexible seal ring formed with an outer portion fixed in the housing, an inner lip engaging radially inward against the outer rub-ring surface, an intermediate portion extending radially inward from the outer portion, and a relatively thin and flexible annular web connecting the lip to the intermediate portion. An inner protector ring is fixed in the seal ring and has a radially inwardly projecting inner flange juxtaposed with the rub ring and spaced radially outward from one of the outer surfaces. An outer protector ring is fixed in the seal ring and has a radially in wardly projecting inner flange juxtaposed with the rub ring and spaced radially outward from one of the outer surfaces.

Such shaft seals are known from EP 91,983, British 590,874, and British 879,503. In such a seal the flexible lip of the seal ring is thus protected by the normally metallic inner and outer protector rings so that foreign matter, in particular dust and particulate material, cannot get to this part of the seal. They also protect this flexible lip during installation of the shaft seal.

Thus the inner and outer protector rings act as a sort of housing that wholly encloses the seal ring, in particular covering its entire outer periphery. The result is that the shaft seal is fairly bulky, in fact much larger than the seal ring which is all that is really doing any work when the seal is installed. Furthermore the inner and outer protector rings frequently form a leak-prone gap with the shaft outer surface and the ends of the rub ring, so that a path is left open for foreign particles to get into the seal.

OBJECTS OF THE INVENTION

It is therefore an object of the present invention to provide an improved shaft seal.

Another object is the provision of such an improved shaft seal which overcomes the above-given disadvantages, that is which is quite compact and where the lip of the seal is very well protected.

SUMMARY OF THE INVENTION

A seal according to the invention for use between a shaft rotatable about and extending along an axis and a housing through which the shaft passes axially has a rub ring fixed on the shaft outer surface and having an outer surface centered on the axis and a flexible seal ring having a pair of outer axially oppositely directed end faces lying in and defining a pair of axially spaced end planes and formed with an outer portion fixed in the housing, an inner lip engaging radially inward against the outer rub-ring surface, an intermediate portion extending radially inward from the outer portion, and a relatively thin and flexible annular web connecting the lip to the intermediate portion. According to the invention an inner protector ring lying axially wholly between the planes and radially wholly within the seal ring is fixed in the seal ring and has a radially inwardly projecting inner flange juxtaposed with the rub ring and spaced radially outward from one of the outer surfaces. Similarly an outer protector ring lying axially wholly between the planes and radially wholly within the seal ring is fixed in the seal ring and has a radially inwardly projecting inner flange juxtaposed with the rub ring and spaced radially outward from one of the outer surfaces.

Thus with this system the shaft seal is very small and in fact its dimensions are dictated by the size of the flexible seal ring in which the protector rings are set, rather than vice versa as in the prior art. The small inset protector rings can be very closely juxtaposed with the respective outer surfaces to minimize leakage.

In accordance with this invention each of the inner flanges lies in a plane generally perpendicular to the axis and has an inner periphery spaced radially outward from one of the outer surfaces. Each ring also has a generally cylindrical outer flange fixed to the seal ring, to the outer portion for the inner ring and to the intermediate portion for the outer ring. In fact the inner flanges of the rings lie on respective ones of the end planes.

According to another feature of this invention the seal ring is provided with an imbedded L-section metallic reinforcing ring having a cylindrical outer flange imbedded in the outer porion and a planar inner flange imbedded in the intermediate portion. The inner flange of the reinforcing ring can in fact have an inner peripheral region forming the outer ring and its inner flange.

To hold lubricant in the seal structure is provided adjacent the outer protector ring for forming an annular lubricant compartment axially inward of the outer protector ring. This structure can be a sheet-metal ring engaged between the rub ring and the outer protector ring or a radially projecting ridge formed on the rub ring. A mass of lubricant grease typically is provided in this compartment.

The one outer surfaces are the outer surface of the shaft so that the rub ring is axially flanked by the inner flanges of the protector rings. It is also possible to provide a wear ring engaged axially between one of the inner flanges and a respective axial end of the rub ring. This wear ring can be consumable, being made of wax or tin.

According to a further feature of the invention the inner flange of the inner protection ring is formed with at least one axially throughgoing lubricant hole and the inner protection ring forms with the rub ring and seal ring an annular lubricant compartment into which the hole opens. A body of filter material is provided in the compartment at the hole so that liquid lubricant passing through the hole must pass through the filter body. Once again a mass of lubricant grease fills the compartment.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIGS. 2, 3, 4, 5, and 6 are views like FIG. 1 of further embodiments of the invention.

SPECIFIC DESCRIPTION

Figure 1:
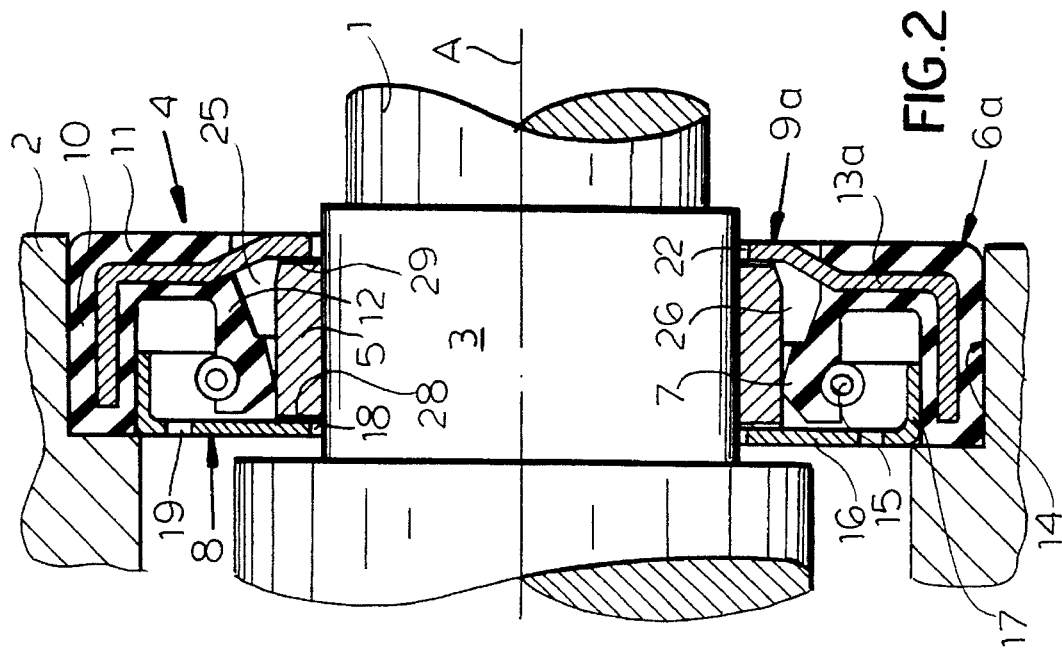
FIG. 1 is an axial section through the seal according to this invention.

As seen in FIG. 1 an arbor or shaft i centered on an axis A passes through a coaxial hole in a fixed housing 2. A cylindrical outer surface 3 of the shaft 1 is surrounded by a seal 4 relative to this housing 2. In turn this seal 4 is comprised of a cylindrical rub ring 5 fixed on the shaft surface 3, an elastomeric C- or U-section seal ring 6 having a flexible lip 7 radially inwardly engaging the ring 5, a rigid inner protector ring 8 and a rigid outer protection ring 9, all centered on the axis A.

The seal ring 6 has a cylindrical outer portion 10 fixed normally by gluing in a seat 14 formed in the housing 2 and an intermediate portion 11 extending radially inward from the portion 10 and having a flexible web 12 carrying the lip 7. A metallic L-section ring 13 is imbedded in the portions 10 and 11 to reinforce the ring 6 which otherwise is formed of an elastomer. A helical spring 15 is tightened around the outer face of the lip 7 and urges same radially inward into engagement with an outer surface of the rub ring 5.

The inner protector ring 8 is of L-section with a flange 16 lying in a plane perpendicular to the axis A and an outer cylindrical flange 17 fixed to the outer part 10 of the ring 6. An inner periphery of the flange 16 defines a small annular spacing or play 18 with the shaft 1. Holes 19 formed in this flange 16 allow a lubricant to be circulated through the seal ring 4.

The outer protector ring 9 is also of L-section with a flange 20 lying in a plane perpendicular to the axis A and an outer cylindrical flange 21 fixed to the inner periphery of the portion 11 of the ring 6. An inner periphery of the flange 20 defines a small annular spacing or play 22 with the shaft 1.

The inner and outer protector rings 8 and 9 are fixed on the seal ring 6 and axially flank the rub ring 5 so that all the parts of the joint 4 can be preassembled and delivered to the end user as a complete package. The fragile lip 7 is therefore protected at all times. Furthermore everything is contained within the axial distance A that is the axial length of the assembly and within an outer diametral distance D. End faces of the seal ring 6 are coplanar with end faces of the flanges 16 and 20 and the outer periphery of the seal 4 is defined by the outer portion 10 of the ring 6.

Figure 2:
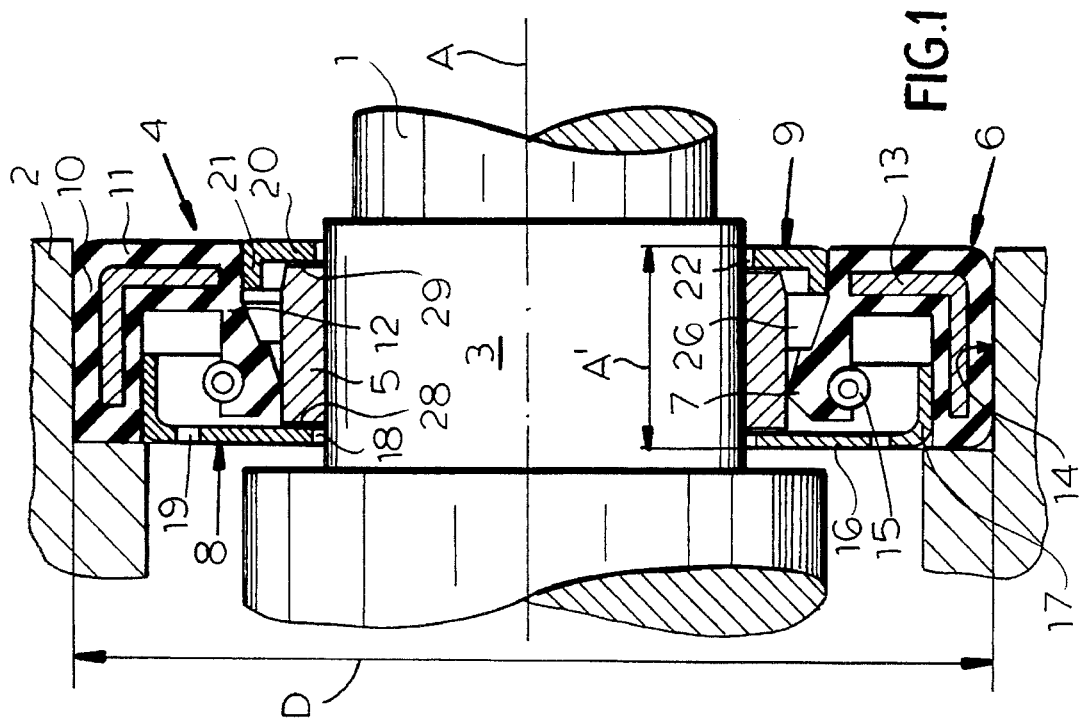

In FIG. 2 a single generally L-section ring forms both the reinforcement 13a and outer ring 9a for the seal ring 6a.

Figure 3:
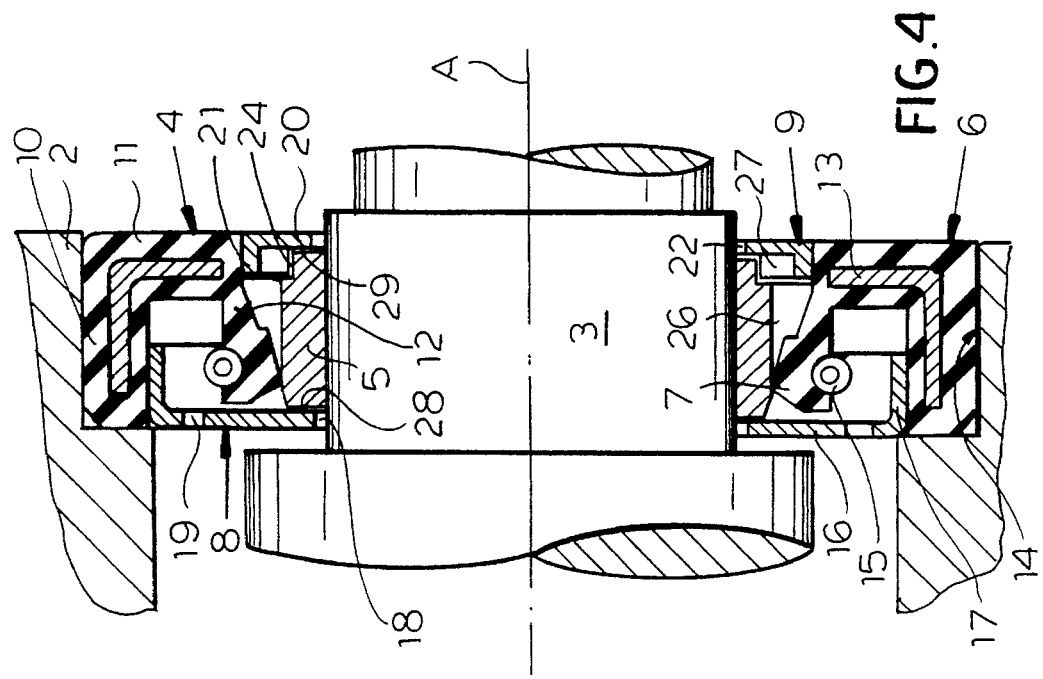

The system of FIG. 3 is a variant on the FIG. 2 embodiment, with an annular filter body 23 fitted in the seal 4 radially outside the lip 7 and radially inside the outer flange 17 of the inner protector ring 8. This filter body 23 is porous to keep particles out of the critical space where the lip 7 touches the cylindrical outer surface of the ring 5 in line contact.

Figure 4:
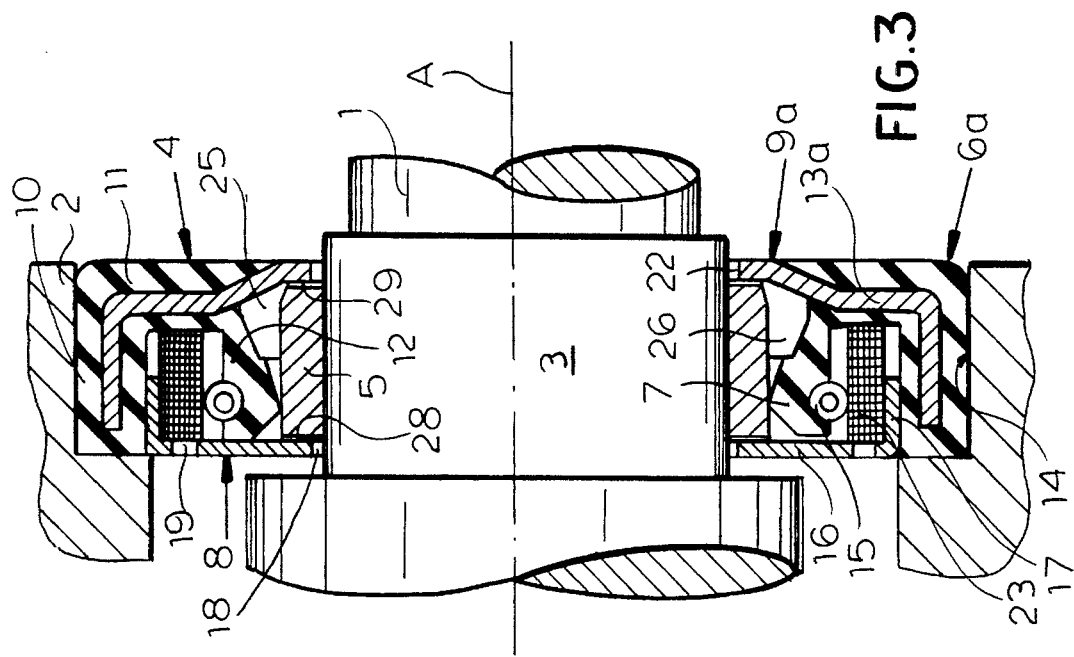

FIG. 4 shows an arrangement identical to that of FIG. 1 except that an L-section sheet-metal ring 24 is provided to form a second barrier against the entry of dust or the like from outside into the seal. This ring 24 is fixed in a groove in the rub ring 5 and has an outer edge bearing lightly axially outward on the flange 21 of the ring 9.

A similar effect is achieved in FIG. 5 by a radially outwardly projecting ridge 25 formed on the rub ring 5 and engaging axially outward against the axial inner end of the flange 21.

FIG. 6 shows an arrangement where an inner protector ring 8a cooperates with an extra-long rub ring 5a. This ring 8a thus defines the play or spacing 18 with the ring 5a rather than with the shaft 1. It would be possible to similarly form the outside ring 9 so that the play 22 was defined between its inner periphery and the outer surface of the rub ring 5.

In all embodiments a space 26 is formed radially inside the lip 7, between it and the ring 5 and this space 26 is normally filled with a lubricant grease. In the arrangements of FIGS. 4 and 5 a space 27 defined between the element 24 or 25 and the ring 9 can also be filled with grease.

Axial play can be adjusted at the ends of the rub ring 5 by providing these ends with a wearable material such as a hard lubricating wax or tin as shown schematically at 28 and 29.

We claim:

1. A seal for use between a shaft rotatable about and extending along an axis and having an outer surface and a housing through which the shaft passes axially, the seal comprising:

a rub ring fixed on the shaft outer surface and having an outer surface centered on the axis;

a one-piece flexible seal ring having a pair of outer axially oppositely directed end faces lying in and defining a pair of axially spaced end planes and unitarily formed with
an outer portion fixed in and directly engaging the housing,
an inner lip engaging radially inward against the outer rub-ring surface,
an intermediate portion extending radially inward from the outer portion, and
a relatively thin and flexible annular web connecting the lip to the intermediate portion;

a rigid inner protector ring lying axially wholly between the planes and radially wholly within the seal ring, fixed in the seal ring, and having a radially inwardly projecting inner flange juxtaposed with the rub ring and having a close radial clearance with one of the outer surfaces; and a rigid outer protector ring lying axially wholly between the planes and radially wholly within the seal ring, fixed in the seal ring, and having a radially inwardly projecting inner flange juxtaposed with the rub ring and having a close radial clearance with one of the outer surfaces.

2. The shaft seal defined in claim 1 wherein the inner flange of the outer protector ring lies in a plane generally perpendicular to the axis and has an inner periphery spaced radially outward from one of the outer surfaces, the outer protector ring also having a generally cylindrical outer flange fixed to the intermediate portion of the seal ring.

3. The shaft seal defined in claim 1 wherein the inner flanges of the rings lie on respective ones of the end planes.

4. The shaft seal defined in claim 1 wherein the seal ring is provided with an imbedded L-section metallic reinforcing ring having a cylindrical outer flange imbedded in the outer porion and a planar inner flange imbedded in the intermediate portion.

5. The shaft seal defined in claim 1 wherein the inner flange of the inner protector ring lies in a plane generally perpendicular to the axis and has an inner periphery spaced radially outward from one of the outer surfaces, the inner protector ring also having a generally cylindrical outer flange fixed to the outer portion of the seal ring.

6. The shaft seal defined in claim 5 wherein the seal ring is provided with an imbedded generally L-section metallic reinforcing ring having a cylindrical outer flange imbedded in the outer portion and an inner flange imbedded in the intermediate portion and having an inner peripheral region forming the outer ring and its inner flange.

7. The shaft seal defined in claim 1 further comprising means including structure adjacent the outer protector ring for forming an annular lubricant compartment axially inward of the outer protector ring.

8. The shaft seal defined in claim 7 wherein the compartment-forming means is a sheet-metal ring engaged between the rub ring and the outer protector ring.

9. The shaft seal defined in claim 7 wherein the compartment-forming means is a radially projecting ridge formed on the rub ring.

10. The shaft seal defined in claim 1 wherein the the inner flanges have a close radial clearance with the outer surface of the shaft, the rub ring being axially flanked by the inner flanges of the protector rings.

11. The shaft seal defined in claim 10, further comprising a wear ring engaged axially between one of the inner flanges and a respective axial end of the rub ring.

12. The shaft seal defined in claim 11 wherein the wear ring is made of wax or tin.

13. The shaft seal defined in claim 11 wherein the inner flange of the inner protection ring is formed with at least one axially throughgoing lubricant hole and the inner protection ring forms with the rub ring and seal ring an annular lubricant compartment into which the hole opens.

14. The shaft seal defined in claim 13, further comprising a body of filter material in the compartment at the hole, whereby liquid lubricant passing through the hole must pass through the filter body.

15. The shaft seal defined in claim 7, further comprising a mass of lubricant grease filling the compartment.

16. The shaft seal defined in claim 1, further comprising an annular spring engaged around and bearing radially inward on the lip.

17. The shaft seal defined in claim 1 wherein the inner flange of the inner ring has an inner periphery radially confronting and spaced from the outer surface of the rub ring.

18. A seal for use between a shaft rotatable about and extending along an axis and having an outer surface and a housing through which the shaft passes axially, the seal comprising:

a rub ring fixed on the shaft outer surface and having an outer surface centered on the axis;

a one-piece flexible seal ring having a pair of outer axially oppositely directed end faces lying in and defining a pair of axially spaced end planes and unitarily formed with an outer portion fixed in and directly engaging the housing, an inner lip engaging radially inward against the outer rub-ring surface, an intermediate portion extending radially inward from the outer portion, and a relatively thin and flexible annular web connecting the lip to the intermediate portion;

a rigid inner protector ring lying axially wholly between the planes and radially wholly within the seal ring, fixed in the seal ring, and having a radially inwardly projecting inner flange juxtaposed with the rub ring and having a close radial clearance with one of the outer surfaces;

a rigid outer protector ring lying axially wholly between the planes and radially wholly within the seal ring, fixed in the seal ring, and having a radially inwardly projecting inner flange juxtaposed with the rub ring and having a close radial clearance with one of the outer surfaces; and means including a sheet-metal ring engaged between the rub ring and the outer protector ring for forming an annular lubricant compartment axially inward of the outer protector ring.

19. A seal for use between a shaft rotatable about and extending along an axis and having an outer surface and a housing through which the shaft passes axially, the seal comprising:

a rub ring fixed on the shaft outer surface and having an outer surface centered on the axis;

a one-piece flexible seal ring having a pair of outer axially oppositely directed end faces lying in and defining a pair of axially spaced end planes and unitarily formed with an outer portion fixed in and directly engaging the housing, an inner lip engaging radially inward against the outer rub-ring surface, an intermediate portion extending radially inward from the outer portion, and a relatively thin and flexible annular web connecting the lip to the intermediate portion;

a rigid inner protector ring lying axially wholly between the planes and radially wholly within the seal ring, fixed in the seal ring, and having a radially inwardly projecting inner flange juxtaposed with the rub ring and having a close radial clearance with the shaft outer surface, the rub ring being axially flanked by the inner flanges of the protector rings;

a rigid outer protector ring lying axially wholly between the planes and radially wholly within the seal ring, fixed in the seal ring, and having a radially inwardly projecting inner flange juxtaposed with the rub ring and having a close radial clearance with one of the outer surfaces; and a wear ring engaged axially between one of the inner flanges and a respective axial end of the rub ring.

* * * * *